US005771283A

United States Patent [19]
Chang et al.

[11] Patent Number: 5,771,283
[45] Date of Patent: Jun. 23, 1998

[54] METHOD FOR DELIVERING ENHANCED CALLER IDENTIFICATION SERVICE IN A TELECOMMUNICATIONS NETWORK

[75] Inventors: Young-fu Chang, Buffalo Grove; Chinmei Chen Lee, Woodbridge, both of Ill.

[73] Assignee: Lucent Technologies Inc., Murray Hill, N.J.

[21] Appl. No.: 548,534

[22] Filed: Oct. 26, 1995

[51] Int. Cl.[6] .......................... H04M 1/56; H04M 15/06
[52] U.S. Cl. ...................... 379/142; 379/127; 379/245
[58] Field of Search ...................... 375/127, 142, 375/201, 210, 219, 220, 230, 221, 244, 245

[56] References Cited

U.S. PATENT DOCUMENTS

| Re. 31,789 | 1/1985 | Hashimoto | 179/5.5 |
|---|---|---|---|
| 3,790,718 | 2/1974 | Jenkins, Jr. | 179/17 D |
| 3,928,732 | 12/1975 | Simon et al. | 179/99 |
| 4,293,737 | 10/1981 | Cepelinski | 179/17 |
| 4,572,660 | 2/1986 | Curtin | 379/88 |
| 4,582,956 | 4/1986 | Doughty | 179/2 |
| 4,646,347 | 2/1987 | Liu | 379/375 |
| 4,723,271 | 2/1988 | Grundtisch | 379/181 |
| 4,763,191 | 8/1988 | Gordon et al. | 358/86 |
| 4,776,005 | 10/1988 | Petriccione et al. | 379/142 |
| 4,788,682 | 11/1988 | Vij et al. | 370/110 |
| 4,942,598 | 7/1990 | Davis | 379/57 |
| 4,985,913 | 1/1991 | Shalom et al. | 179/76 |
| 4,998,273 | 3/1991 | Nichols | 379/102 |
| 5,029,202 | 7/1991 | Doernback, Jr. et al. | 379/201 |
| 5,040,209 | 8/1991 | Greenbert et al. | 379/373 |
| 5,086,458 | 2/1992 | Bowen | 379/180 |
| 5,097,528 | 3/1992 | Gursahaney et al. | 379/67 |
| 5,200,994 | 4/1993 | Sasano et al. | 379/142 |
| 5,210,789 | 5/1993 | Jeffus et al. | 379/127 |
| 5,214,691 | 5/1993 | Cotton et al. | 379/157 |
| 5,253,289 | 10/1993 | Tanaka | 379/373 |
| 5,263,084 | 11/1993 | Chaput et al. | 379/215 |
| 5,333,185 | 7/1994 | Burke et al. | 379/142 |
| 5,341,414 | 8/1994 | Popke | 379/142 |
| 5,351,285 | 9/1994 | Katz | 379/94 |
| 5,388,147 | 2/1995 | Grimes | 379/59 |
| 5,572,579 | 11/1996 | Orriss et al. | 379/142 |

Primary Examiner—Curtis Kuntz
Assistant Examiner—Paul Loomis
Attorney, Agent, or Firm—Mony R. Ghose

[57] ABSTRACT

A method for delivering enhanced caller identification (ID) service including geographic location information comprises initializing an originating switch with geographic identification data (GID). The GID is stored in each switch module memory, and is accessed by the originating switch each time a calling party initiates a call to a called party. If the called party subscribes to caller ID service, the calling's party directory number, and the GID associated with the switch is delivered to the called party as part of caller ID service so that the true geographic location of the caller can be ascertained.

11 Claims, 4 Drawing Sheets

5,771,283

METHOD FOR DELIVERING ENHANCED CALLER IDENTIFICATION SERVICE IN A TELECOMMUNICATIONS NETWORK

TECHNICAL FIELD

This invention relates to the field of telecommunications networks and, more particularly, to delivering enhanced caller identification service by providing geographic location information to a called party receiving calls which originate from a customer line identified by a ported directory number in such telecommunications networks.

BACKGROUND OF THE INVENTION

The United States telecommunications industry is in a state of transition. During the next several years, it is expected that the monopoly held by local exchange carriers (LECs) will be substantially altered, and that competitive access providers (CAPs) will begin to offer customer service for both toll and local exchange calls. To facilitate the transition without creating an excessive burden on customers who wish to become CAP subscribers, a requirement for service provider number portability, defined as a change in service provider without a change in directory number, is anticipated. Eventually, geographic or "location" number portability will also be available so that a telephone customer can move to a distant geographic location, and maintain a current directory number.

Presently, calls between telephone customers in the United States are established on the basis of a national numbering plan which requires each customer line to be identified by a ten-digit directory number. The ten-digit directory number comprises a three-digit area code (generally denoted by the letters "NPA") defining a specific geographic region followed by a three-digit office code (denoted by the letters "NXX") identifying a particular central office switch in the network. A central office switch normally serves multiple office codes. The office code is followed by a four-digit customer line identifier (denoted by the letters "XXXX") establishing the network address of a particular customer line served by the central office switch identified by the NXX digits of the directory number. Customers who relocate to distant geographic locations (or, at least to locations not served by their current area code) but who retain an existing directory number are necessarily served by a central office switch that normally serves customer lines associated with NPA-NXX digits different than the NPA-NXX digits of the relocated customer's directory number. In other words, such relocated customers have "ported" directory numbers.

Although location number portability is beneficial to those customers who want to forego the inconvenience of a directory number change due to relocation, porting directory numbers to distant locations is likely to cause confusion each time a ported directory number caller initiates a call to a called party who subscribes to caller identification (ID) service. Caller ID is a service which allows a called party to view the directory number of the customer line from which an incoming call is originated so that directory number-based information about the caller can be obtained before the call is answered. The service is especially valuable to businesses which use caller ID to enhance efficiency by accessing customer records prior to answering the call or, by routing incoming calls to specific customer representatives based on a presumed geographic location of the caller by virtue of directory number digits. The existence of ported directory numbers complicates caller ID service because such directory numbers necessarily contain digits that correspond to a geographic location that does not reflect the true geographic location of the caller.

Therefore, there is a need in the art for delivering enhanced caller ID service such that geographic identification data (GID) is provided along with a caller's directory number so that the true geographic location of a ported directory number caller can be determined.

SUMMARY OF INVENTION

This need is addressed and a technological advanced is achieved in the telecommunications art by the method and system of the present invention which enhances existing caller ID service so that a called party receives GID with a caller's directory number.

In a preferred embodiment of the method of the present invention, each call initiated from an originating central office switch includes geographic identification data in an initial address message (IAM) delivered to a terminating central office switch for call set-up processing. Although the GID may take any form, it is preferably a location routing number (LRN) identifier as described in the commonly assigned, co-pending U.S. patent application Ser. No. 08/410,585 to Akinpelu et al. (hereinafter, the "Akinpelu application"). The LRN identifier is similar to a traditional ten-digit directory number in that the first six digits correspond to NPA-NXX digits. Unlike the conventional numbering plan, however, each central office switch is identified by a single LRN identifier (i.e. a single set of NPA-NXX digits) regardless of how many office codes the switch serves. In other words, each LRN identifier corresponds to a particular central office switch at a specific location in the telecommunications network. Subscription to caller ID service includes GID which is delivered, in conjunction with the caller's directory number, to a called party. If the caller has a ported directory number, the GID enables the subscriber to ascertain the true geographic location of the calling party.

DETAILED DESCRIPTION

To facilitate the description of the present invention, consider the example of a business telephone customer located in Houston, Tex., who owns a successful pizza delivery service (PDS) having a main location in a northern portion of the city, and a branch location in a southern portion of the city. A central office switch corresponding to LRN identifier digits "713-777" serves north Houston, and another central office switch corresponding to LRN identifier digits "713-888" serves south Houston. Therefore, it is generally well-known that those who reside on the north side of Houston normally have directory numbers including office code digits "777" while those who reside on the south side of Houston have directory numbers including office code digits "888".

To minimize cost and customer confusion which may occur as a result of advertising multiple directory numbers, the PDS uses a single directory number "713-888-5962" associated with the main location to receive all customer order calls. Once a call is received, the PDS employs caller ID service to distribute the call based on a presumed geographic location of the caller as determined by the caller's directory number. If a caller's directory number includes office code digits "777", it is assumed that the caller is located on the north side of Houston, and the call is answered and processed by the customer representative at the main location. If the caller's directory number includes office code digits "888", it is assumed that the caller resides on the south side of Houston, and the call is immediately transferred to the branch location.

Figure 1:
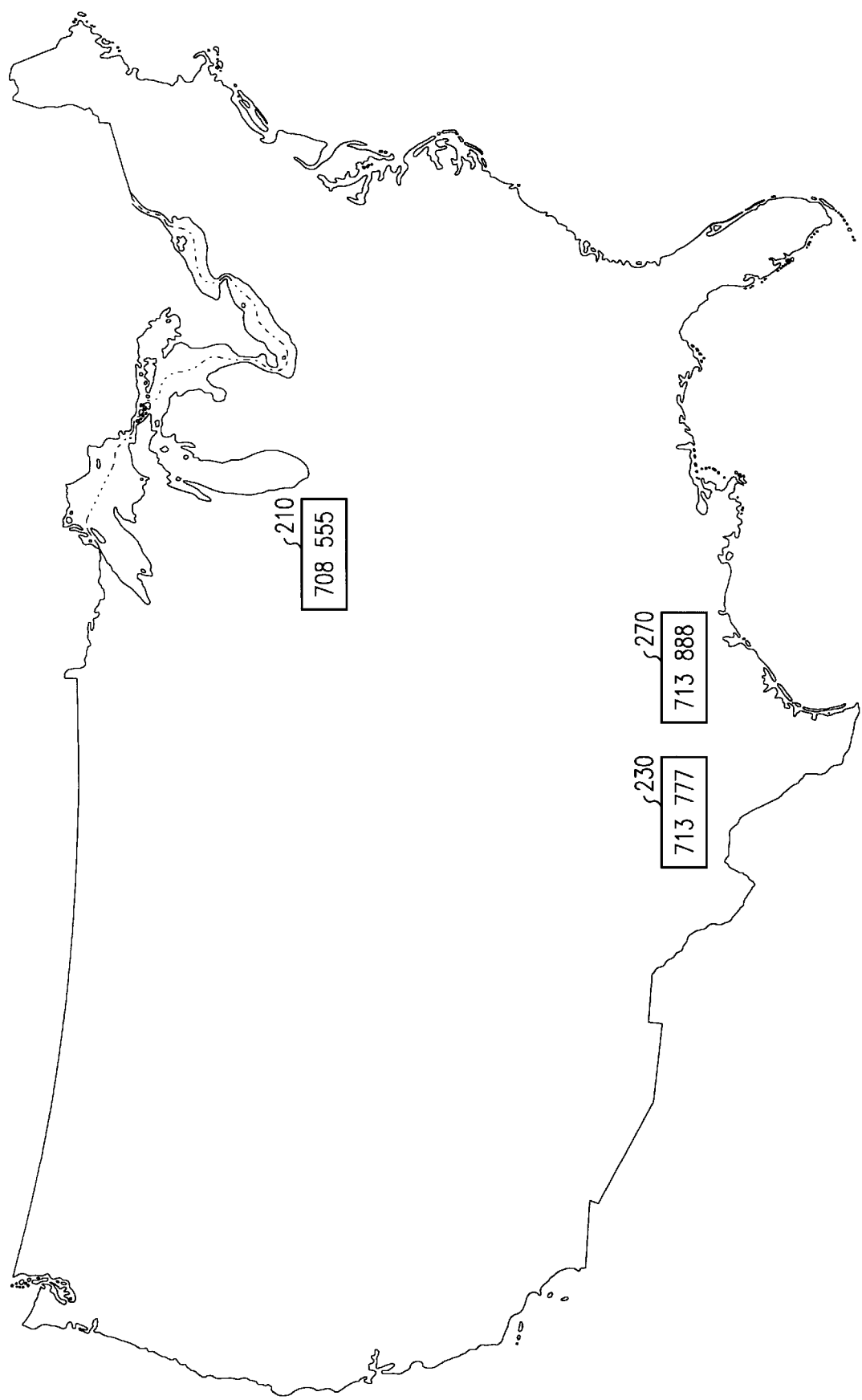
FIG. 1 shows a map of the United States including the respective geographic locations of selected central office switches in a telecommunication network.

FIG. 1 shows a map of the United States including the respective geographic locations of selected central office switches. Assume that a telephone customer has recently relocated from Wheaton, Ill. to north Houston, Tex., and has ported a directory number "708-555-1234". First central office switch 210 is located in the state of Illinois, and corresponds to LRN identifier digits "708-555". In this embodiment, switch 210 previously served the relocated customer. Second central office switch 230 (LRN identifier "713-777") serves telephone customers in north Houston, and third central office switch 270 (LRN identifier "713-888") serves telephone customers in south Houston.

Figure 2:
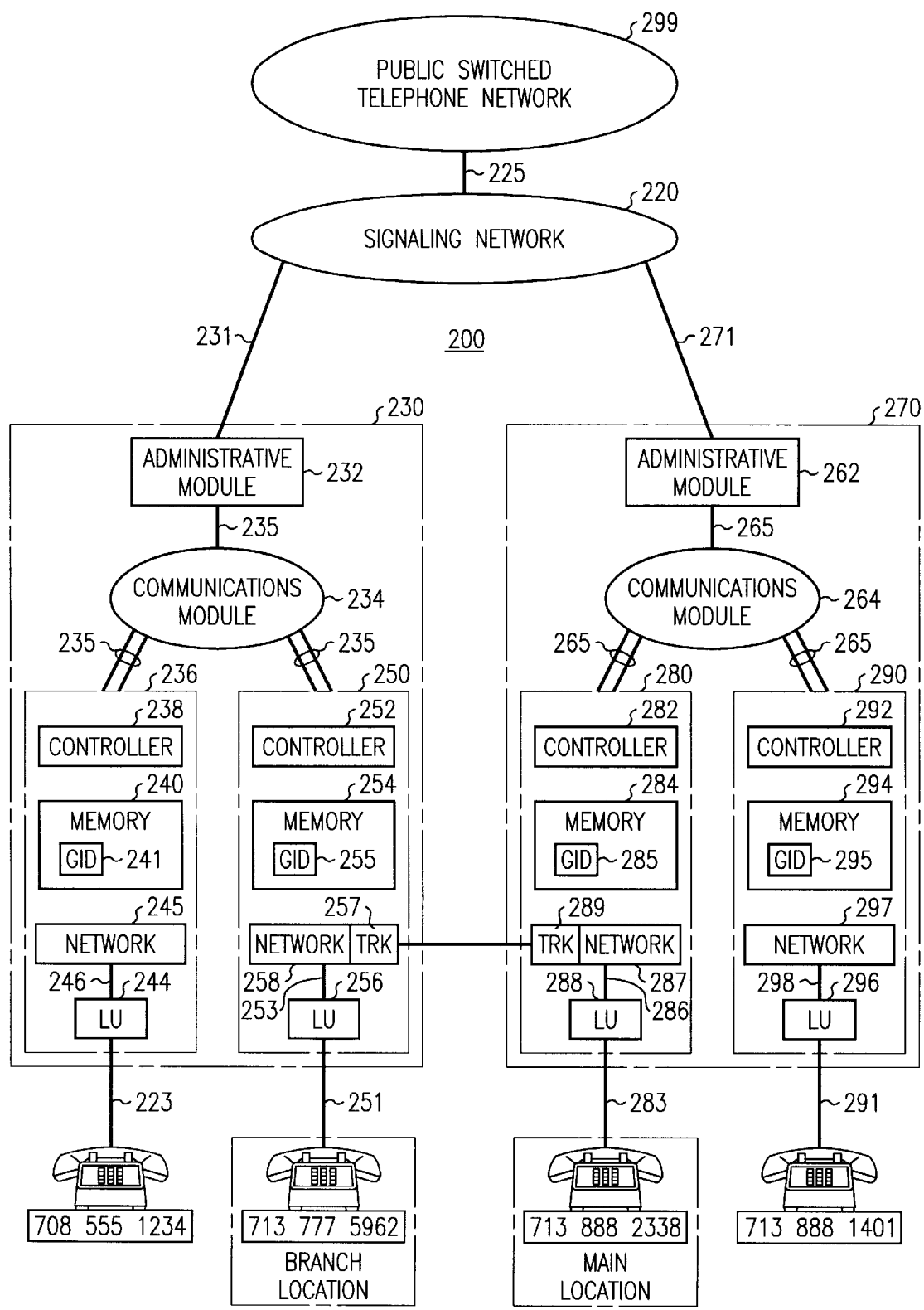
FIG. 2 shows a simplified block diagram of a telecommunications system in which the method of the present invention may be practiced.

FIG. 2 shows a simplified block diagram of telecommunications system 200 including second central office switch 230 (the "originating" switch), third central office switch 270 (the "terminating" switch) and signaling network 220. In the preferred embodiment of the present invention, each central office switch is the 5ESS® digital switch manufactured and sold by AT&T.

Switch 230 includes three major components: administrative module (AM) 232; communications module (CM) 234; and switch modules (SM) 236 and 250. AM 232 is responsible for administering global maintenance and control functions. CM 234 serves as a communications conduit between AM 232 and each switch module. Communication among the various components within central office switch 230 is accomplished via network control and timing (NCT) links 235. As convention dictates, dual NCT links are shown between each switch module and CM 234.

SM 236 comprises controller 238 for module control, memory 240 for storing information including geographic identification data (GID) 241 and network element 245. In the preferred embodiment, SM memory 240 is initialized with GID 241 which is the LRN identifier of switch 230 "713-777". In alternative embodiments GID 241 may take the form of any other string of digits with geographic significance. Network element 245 is interconnected, via link 246, to line unit 244 which acts as an interface between customer line 223 and switch 230. In this example, customer line 223 is identified by ported directory number "708-555-1234", and serves the customer who has relocated from Illinois to Texas. Although a functional SM serves a plurality of customer lines, only a single line is shown for clarity. SM 250 comprises controller 252, memory 254 for storing information including GID 255, trunk facility 257 and network element 258. SM memory 254 is initialized with GID 255 which is also switch 230 LRN identifier "713-777". Trunk facility 257 coordinates trunk connections between switch 230 and other network nodes, including the public switched telephone network (PSTN) 299, as is known in the art. Line unit 256 is interconnected to network element 258 by link 253, and acts as an interface between switch 230 and customer line 251. Customer line 251 serves the PDS branch location, and is identified by directory number "713-777-5962".

Central office switch 270 also includes three major components: administrative module (AM) 262; communications module (CM) 264; and switch modules (SM) 280 and 290. AM 262 is responsible for administering global maintenance and control functions. CM 264 serves as a communications conduit between AM 262 and each of the switch modules. Communication among the various components within central office switch 270 is accomplished via network control and timing (NCT links) 265. Dual NCT links are shown between each switch module and CM 264.

SM 280 comprises controller 282 for module control, memory 284 for storing information including GID 285, network element 287 and trunk facility 289. In this embodiment, SM memory 284 is initialized with GID 285 which comprises switch 270 LRN identifier "713-888". Trunk facility 289 maintains trunk connections between switch 270 and other network nodes. As shown, bi-directional trunk connection 259 is established between trunk facility 257 of switch 230 and trunk facility 289. Trunk facility 289 is also used to interconnect switch 270 with PSTN 299, as is known in the art. Line unit 288 is interconnected to network element 287 via link 286, and acts as an interface between customer line 283 and switch 270. Customer line 283 is identified by directory number "713-888-2338", and serves the PDS main location. Customer line 283 subscribes to the enhanced caller ID service feature, as described below. SM 290 comprises controller 292, memory 294 including GID 295, and network element 297. SM memory 294 is initialized with GID 295 which comprises switch 270 LRN identifier "713-888". Line unit 296 is interconnected to network element 297 via link 298, and serves as an interface between customer line 291 and the switch. Customer line 291 is identified by the directory number "713-888-1401".

In this particular embodiment, GID information is contained in each central office switch. For administrative convenience, however, other embodiments may store GID information in a central database for access by a plurality of central office switches. In other words, the storage location of the GID information is not critical.

Also shown is signaling network 220 which receives and relays signaling messages among network nodes, as is known in the art. Central office switch 230 is inter-connected to signaling network 220 via signaling link 231, and central office switch 270 is inter-connected to the network via signaling link 271. Signaling network 220 is interconnected to PSTN 299 via link 225.

Figure 3A:
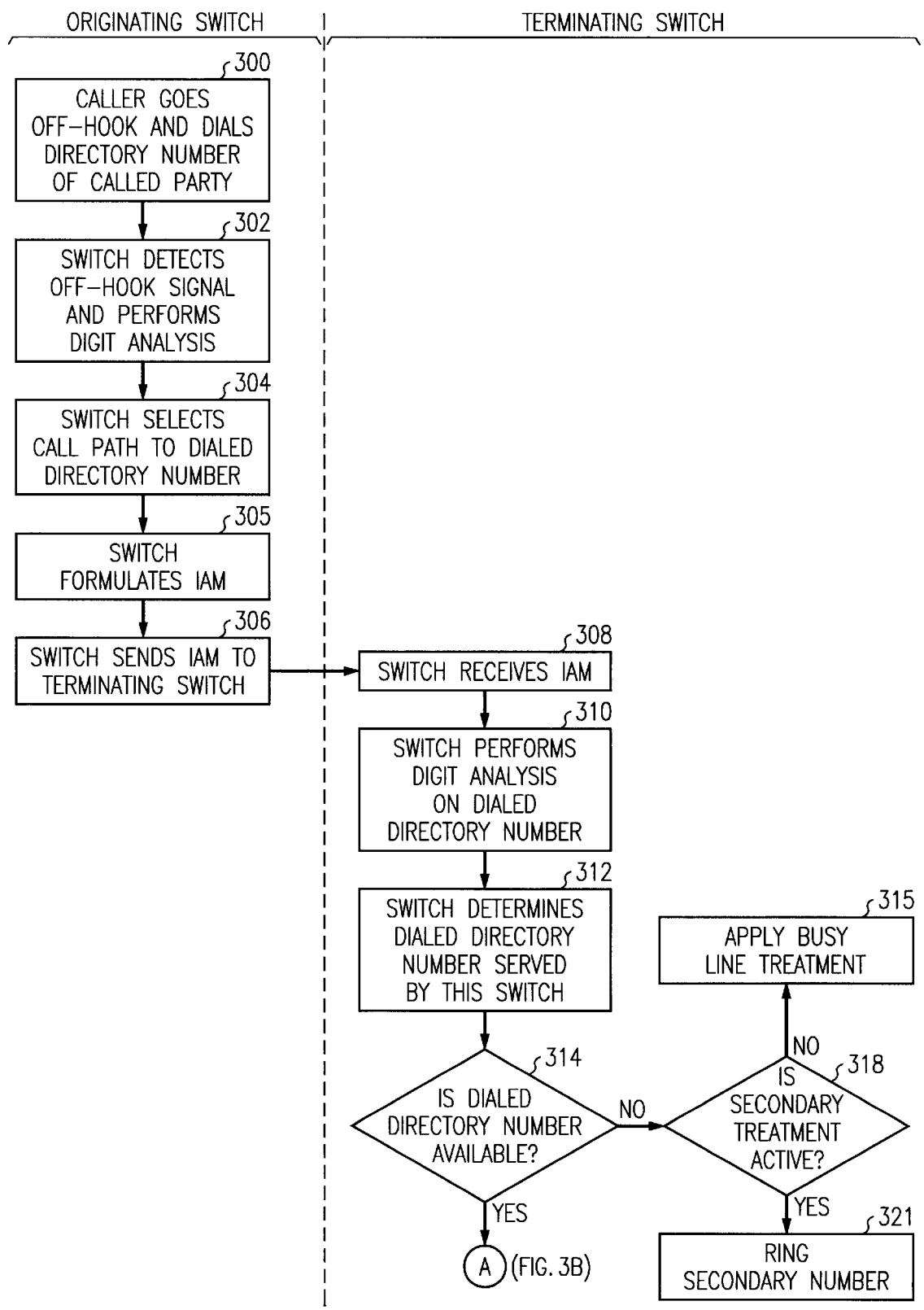
FIG. 3 is a flow diagram of the steps performed by the telecommunications system of FIG. 2 in accordance with the method of the present invention.
Figure 3B:
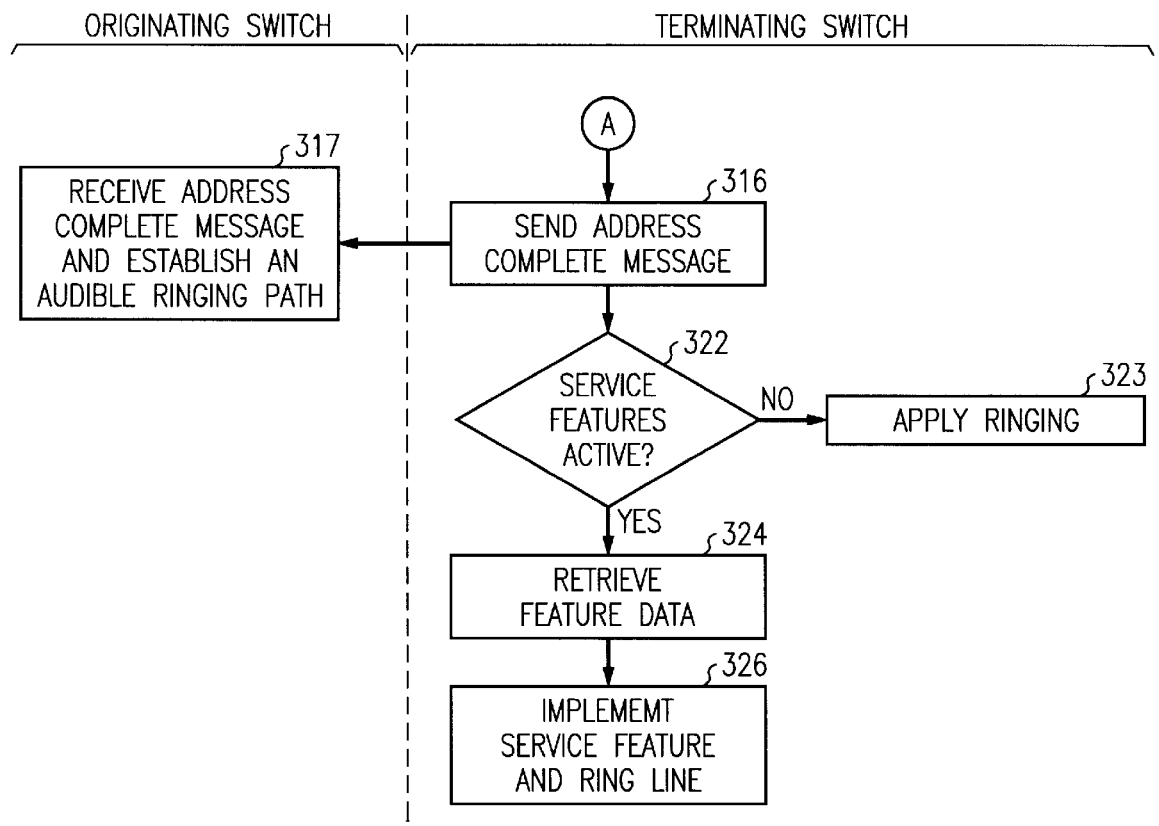

FIGS. 3A and 3B are divided flow diagrams of the steps performed in telecommunications system 200 for delivering enhanced caller ID service to a customer line in accordance with the method of the present invention. For purposes of example, assume that the above-mentioned relocated customer wishes to place an order with the PDS. The process begins in step 300 when the customer (hereinafter, the "caller") served by originating switch 230 goes off-hook, and dials a destination directory number which is the PDS main location directory number "888-2338". In step 302, the originating switch detects the off-hook signal, and performs digit analysis of the destination directory number "713-888-

2338". Although the caller actually dialed "888-2338", originating switch 230 automatically pre-appends the NPA digits "713" to the dialed number, as is known in the art. The process continues to step 304 in which originating switch 230 selects a call path to the switch that serves the destination directory number (terminating switch 270), as is known in the art. In this example, bidirectional trunk connection 259 is selected for establishing a connection between originating switch trunk facility 257 and terminating switch trunk facility 289. In step 305, originating switch 230 retrieves necessary data including GID information, and formulates an initial address message including: the called (destination) directory number; the calling directory number; call path information (e.g. the trunk address); and geographic identification data unique to the originating switch. In this example, the IAM includes: destination directory number "713-888-5962"; calling directory number "708-555-1234"; call path information including trunk 259 address; and geographic identification data "713-777". In step 306, originating switch 230 sends the IAM to terminating switch 270 via signaling network 220.

The process continues to step 308 in which terminating switch 270 receives the IAM from switch 230 via signaling network 220, and stores it in SM memory 284. In step 310, terminating switch 270 performs digit analysis on the destination directory number to verify that a customer line associated with the received directory number is served by the switch. In step 312, switch 270 determines that the destination directory number is served by SM 280. The process continues to decision step 314 in which terminating switch 270 determines if the customer line associated with the destination directory number is available to receive calls (e.g. it is determined whether the line is busy). If the outcome of decision step 314 is a "NO" determination, the process continues to decision step 318 in which it is determined whether pre-established secondary treatment is active. Pre-established secondary treatment allows a called party to specify how an incoming call is to be handled if the destination directory number is unavailable. Types of secondary treatment include forwarding the call to another customer line or, terminating the call to an answering service. For example, if the PDS main location is unavailable, pre-established secondary treatment might require that the call be automatically forwarded to the PDS branch location. If the outcome of decision step 318 is a "NO" determination, the process continues to step 315 in which busy line treatment is applied, as is known in the art. If the outcome of decision step 318 is a "YES" determination, the process continues to step 321 in which secondary treatment is applied.

In this case, however, the outcome of decision step 314 is a "YES" determination, so the process continues through connector A to FIG. 3B. In FIG. 3B step 316, terminating switch 270 sends an address complete message to switch 230 via signaling network 220. The address complete message indicates that the destination directory was found, and is available to receive the call.

In step 317, originating switch 230 receives the address complete message, and establishes an audible ringing path to the destination directory number via the previously selected call path. Simultaneously, in decision step 322, the terminating switch determines whether the customer line associated with the destination directory number subscribes to the enhanced caller ID service feature. In other words, switch 270 accesses customer data stored in SM memory 284 to determine whether the customer line 283 subscribes to any service features (particularly, caller ID service). If the outcome of decision step 322 is a "NO" decision, the process continues to step 323 in which normal ringing is applied to the line. If, as in this case, the outcome of decision step 322 is a "YES" decision, the process continues to step 324 in which switch 270 retrieves data necessary to implement enhanced caller ID service. In this case, switch 270 retrieves the caller's directory number "708-555-1234" and GID "713-777" associated with the caller's directory number from the IAM received from the originating switch, and stored in the SM memory 284. The process continues to step 326 in which ringing is applied to the customer line associated with the destination directory number, and the enhanced caller ID service is delivered to the called party. In this example, ringing is applied to customer line 283 and the caller's directory number "708-555-1234" and GID "713-777" is delivered so that the information appears on a visual display of customer premises equipment at the PDS main location. Even though the customer representative at the PDS main location may not recognize the geographic location associated with the directory number digits "708-555-1234", he or she is likely to recognize the GID digits "713-777", so that the call will be processed as if it was received from north Houston which is the true geographic location of the caller.

Figure 4:
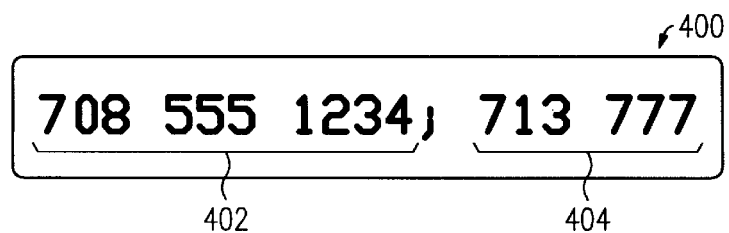
FIG. 4 shows a representation of an enhanced caller ID visual display including directory number and geographic identification data.

FIG. 4 is a graphical representation of visual display 400 of the customer premises equipment at the PDS main location upon receiving the above-described enhanced caller ID information. Segment 402 is the caller's directory number "708-555-1234", and segment 404 is the caller's geographic identification "713-777". In alternative embodiments, the GID may be any other representation of the caller's location. For example, the GID may be specific to each caller, such as a GID which is the caller's zip code, and may be initialized in the line unit that serves the customer line associated with the caller.

While the invention has been particularly illustrated and described with reference to the preferred embodiment above, it is understood that numerous other arrangements may be devised by those skilled in the art without departing from the scope of the invention.

What is claimed is:

1. In a telecommunications system comprising an originating switch and a terminating switch wherein each switch serves at least one customer line, a method for delivering enhanced caller identification (ID) to a customer line comprises the steps of:

receiving, in the terminating switch, geographic identification data (GID) unique to the originating switch wherein the GID is not a directory number;

determining whether a customer line served by the terminating switch subscribes to caller ID service; and delivering the GID to the customer line served by the terminating switch upon the determination that the customer line subscribes to caller ID service.

2. The method of claim 1 further comprising the step of: the originating switch retrieving GID from the originating switch memory.

3. The method of claim 1 further comprising the step of: the originating switch retrieving GID from a central database which serves a plurality of switches.

4. The method of claim 1 further comprising the step of: initializing the originating switch memory with GID information.

5. The method of claim 1 further comprising the step of: initializing each line unit in the originating switch so that it includes GID information specific to the customer line served by the line unit.

6. In a telecommunications system comprising an originating switch serving at least one ported directory number caller, and a terminating switch serving at least one called party who subscribes to caller identification (ID) service, a method for delivering a true geographic location of the ported directory number caller to the called party comprises the steps of:

the originating switch detecting an off-hook signal from a customer line associated with the ported directory number caller;

the originating switch receiving a dialed destination directory number from the ported directory number caller wherein the dialed destination directory number corresponds to the called party who subscribes to caller ID service, and is served by the terminating switch the originating switch formulating an initial address message (IAM) including geographic identification data (GID) for delivery to the terminating switch;

the terminating switch determining that the called party identified in the IAM received from the originating switch subscribes to caller ID service; and the terminating switch delivering the GID of the caller to the called party, wherein the GID is not a directory number.

7. The method of claim 6 further comprising the step of:

initializing an originating switch memory with the GID information.

8. The method of claim 6 further comprising the step of:

initializing a line unit associated with the ported directory number caller with the GID information.

9. A central office switch in a telecommunications system comprises:

an administrative module for administering global control functions interconnected to a communications module; and a plurality of switch modules interconnected to the communications module, each switch module comprising:

a switch module memory including geographic identification data (GID) associated with the central office switch, wherein the GID is a location routing number (LRN) identifier unique to the central office switch; and a line unit interconnected to a customer line, wherein the customer line is identified by a directory number.

10. The central office switch of claim 9 further comprising a switch module memory including GID which is a postal zip code associated with a geographic region in which the central office switch is located.

11. The central office switch of claim 9 and further comprising;

the line unit including GID associated with the customer line served by the line unit.

* * * * *